May 19, 1953   J. E. SHERBORNE   2,639,090
ELECTRICAL RESERVOIR MODEL
Filed Oct. 13, 1949
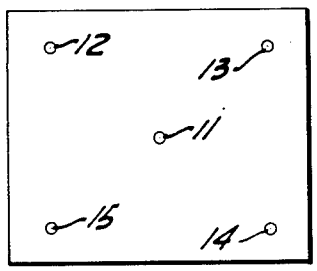
FIG. 1
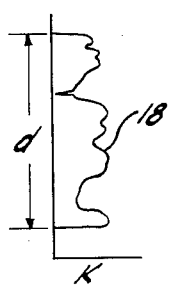
FIG. 2
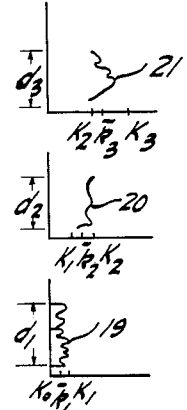
FIG. 3
FIG. 4
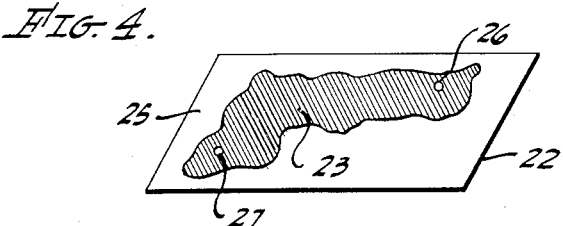
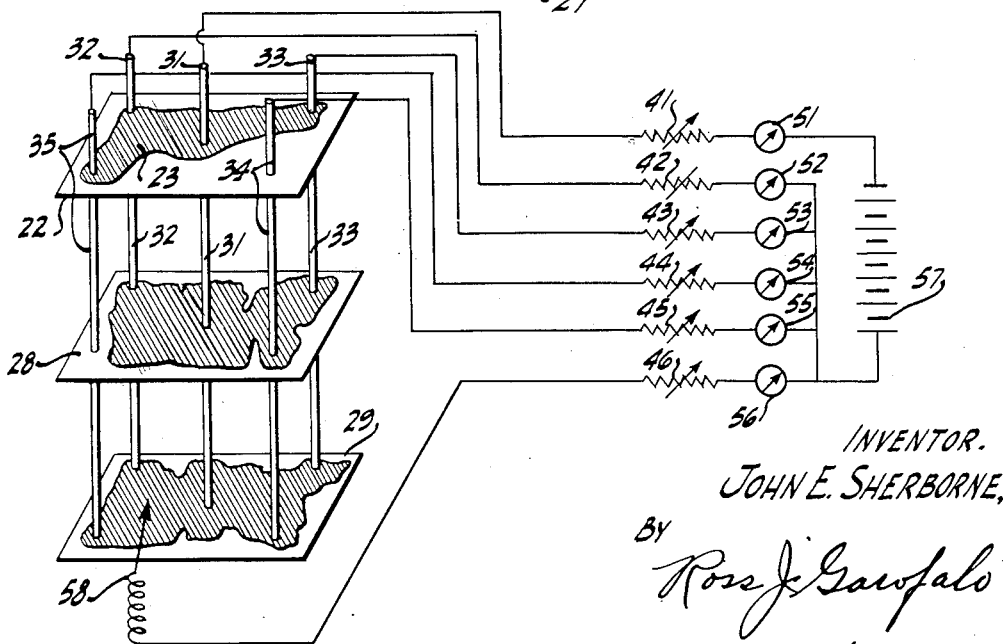
FIG. 5
INVENTOR.
JOHN E. SHERBORNE,
BY
Ross J. Garofalo
ATTORNEY.

Patented May 19, 1953

2,639,090

UNITED STATES PATENT OFFICE 2,639,090

ELECTRICAL RESERVOIR MODEL

John E. Sherborne, Whittier, Calif., assignor to Union Oil Company of California, Los Angeles, Calif., a corporation of California Application October 13, 1949, Serial No. 121,094

15 Claims. (Cl. 235—61)

This invention relates generally to the construction of electrical models to simulate the physical behavior of oil-bearing reservoirs and to the uses of such models. More particularly, this invention relates to the construction and to the use of electrical models for the simulation and study of oil-bearing reservoirs undergoing primary and secondary recovery, e. g., cycling, gas drive, water flooding and the like.

The physical analogy existing between fluid flow through a permeable membrane and electrical current flow through an electrical conductor has been described in "Flow in Homogeneous Fluids" by M. Muskat. In comparing fluid flow to electrical flow, the hydrodynamic pressure gradient corresponds to the voltage or potential gradient while the ratio of permeability to viscosity corresponds to specific conductivity. This principle has been widely used through the petroleum industry to study oil, gas and water flow through oil and gas-bearing formations.

For preparing electrical models of the oil-bearing reservoir the common approach in the past has been to assume formations of uniform thickness and permeability whereby a planar model of uniform conductivity is required and such can be easily constructed. In handling more complicated reservoirs an average permeability is assumed and variations of formation thickness are represented by varying the depth and shape of an electrolytic bath.

During the actual flooding of an oil reservoir with water or during gas drives of such reservoirs the flooding or driving agent normally pursues avenues of minimum resistance and flows very rapidly through highly permeable portions of the zone and relatively slowly through less permeable portions. Previous electrical models, wherein an average permeability has been tacitly assumed for the entire reservoir, or for a section of the reservoir, have made no allowance for this factor, and data obtained thereby have been of rather limited value.

It is an object of this invention to construct and use an electrical model analogue of oil-bearing formations wherein the effect of varying flow through strata of varying permeability within the formation is represented.

It is another object of this invention to represent oil-bearing reservoir comprising a numerous strata, separable into a series of distinct permeability classes, by means of an electrical model comprising a series of separate layers, wherein each group of strata of a given permeability class is represented by one of the series of layers.

It is another object of the invention to provide a model layer whose electrical conductivity is varied throughout a vertical section in proportion to the average permeability of a corresponding section or sections of earth strata being represented and to the vertical depth of said section or sections.

It is another object of this invention to employ an integrated series of model layers to simulate an oil-bearing formation wherein each layer represents a grouping of all strata of a given permeability class within a vertical projection section of the formation.

It is another object of this invention to prepare solid model layers for representing oil-bearing formations.

It is another object of this invention to prepare model layers by imprinting a dispersion of an electrically conductive material upon a relatively non-conductive material.

Briefly this invention relates to the construction and use of a multi-layered electric model for simulating various conditions and flows within an oil-bearing reservoir such as those conditions and flows which occur during secondary recovery operations. Preparatory to the construction of the model permeability data throughout the volume of the reservoir are determined from the testing of well bore samples, from estimates, calculations or any such methods. The reservoir is then divided into a series of vertical cross-sections and the strata within each section are classified according to the value of their permeability into a series of permeability classes. Within each vertical cross-section the vertical extent, i. e., number of vertical feet, of strata falling within each permeability class is determined. A model layer is prepared for each permeability class by cutting or molding a vertical projection of the reservoir from an electrically non-conducting material. An electrically conducting material is imprinted thereon, the density of which in a given vertical projection area is proportional to the product of the vertical extent of the strata projected into the given area by the average permeability of the class. The layers each representing a particular permeability class are inter-connected by low resistance conductors forming electrodes to simulate well bores, production wells and input wells.

In the employment of the model to simulate a water flooding operation, direct current voltages are applied between the electrodes representing input wells and the electrodes representing output wells such that the current flow into each of the input well electrodes and out of each of the output well electrodes is proportional to the injection rates into the respective input wells and out of the respective output wells respectively. A probe is then employed to determine equipotential contours throughout the region of each of the model layers. The determinations of the equipotential contours for each model layer are transferred to separate geological maps of the reservoir and are thereafter employed to determine transit times for the transport of oil from one point to another point within each of the classes of strata. Such data are employed to predict water break through in any of the output wells and to assist in operating the field to its greatest productivity.

Attached Figures 1, 2, 3, 4 and 5 serve to illustrate the apparatus and methods of this invention.

Referring now more particularly to attached Figure 1, there is illustrated a plan view of an oil field in which injection well 11 is employed to force a driving fluid such as water or gas into an oil-bearing reservoir and production wells 12, 13, 14 and 15 respectively are employed to pump fluids containing oil from the oil-bearing reservoir, wherein the injection well being relatively centrally located with respect to said production wells.

In Figure 2 curve 18 shows the variation of permeability K with respect to vertical distance throughout distance interval $d$ in the section of the reservoir traversed by the bore hole of production well 15. Other curves show the variation of permeability K with respect to vertical distance $d$ are available for other well locations scattered throughout the extent of the reservoir. Data of this type are generally available for each place where a well bore has been drilled but in the absence of such direct information such curves may comprise estimated curves based upon the lithological properties of the formation or may even comprise assumed curves for real or hypothetical reservoirs.

Figure 3 illustrates a breakdown of curve 18 into a series of three breakdown curves 19, 20 and 21 based upon the value of the permeability. Thus breakdown curves 19, 20 and 21 show that in curve 18 there are $d_1$ feet of strata having a permeability between $K_0$ and $K_1$ wherein the average permeability is $\overline{k}_1$, $d_2$ feet of strata having a permeability between $K_1$ and $K_2$ wherein the average permeability is $\overline{k}_2$, and $d_3$ feet of strata having a permeability between $K_2$ and $K_3$ wherein the average permeability is $\overline{k}_3$.

Figure 4 shows a single model layer 22 representing all strata throughout the reservoir having a permeability between $K_0$ and $K_1$. Shaded area 23 comprises varying thicknesses of electrically conducting material showing the presence of strata of the represented permeability class while non-shaded area 25 contains no electrical conducting material and shows the absence of strata of the particular permeability class in such projection areas.

Production well 13 is indicated by point 26 on model layer 22. In the vertical section of the reservoir representing the area immediately surrounding point 26 there are $d_1$ feet of formation strata having permeabilities between $K_0$ and $K_1$ whose average permeability is $\overline{k}_1$, as determined from curve 19 of Figure 3. If a value of X mhos of electrical conductivity per sq. cm. is assigned to represent 1 millidarcy-foot of strata per sq. yd. of vertical projection in the reservoir, in the construction of the particular model, then the concentration of the electrical conductor in the area immediately surrounding point 26 is $Xd_1\overline{K}_1$ per sq. cm. where $\overline{K}_1$ is the average permeability of all strata of the reservoir whose permeabilities fall within the interval $K_0$ to $K_1$. $\overline{K}_1$ is obtained by averaging $\overline{k}_1$ throughout the region of the oil-bearing formation represented by the model layer. The concentration of electrical conductor throughout other sections of shaded areas 23 and 24 is likewise determined from reservoir data. Thus at point 27 for which location permeability data are known, the number of feet of formation having a permeability between $K_0$ and $K_1$ is determined. The number of feet is then multiplied by $X\overline{K}_1$ to determine the required mhos/sq. cm. in the proximity of point 27.

For any point throughout the surface of model layer 22 there exists a function $D_1$ representing the number of vertical feet of strata having a permeability in the 1st permeability class range $K_0$ to $K_1$. The required conductivity at any point is then determined throughout the model layer 22 by the expression $X\overline{K}_1D_1$ where X and $\overline{K}_1$ have their previous meanings and $D_1$ is the number of feet of strata of the first permeability class at that point.

In Figure 5 there are illustrated three model layers, 22, 28 and 29 respectively, which have been arranged into an integrated electrical model. Model layers 28 and 29 have been constructed in substantially the same manner as was model layer 22 using permeability and vertical extent data for permeabilities in the class intervals $K_1$ to $K_2$ and $K_2$ to $K_3$ respectively. In assembling model layers 22, 28 and 29 into an integrated model, electrodes 31, 32, 33, 34 and 35 having low electrical resistances are employed to interconnect the layers at all of those points of each layer which correspond to injection well 11 and to production wells 12, 13, 14 and 15 respectively.

Referring further to Figure 5 for the operation of the assembled model, a source of E. M. F. 57 is provided and the one terminal, e. g. the negative, is connected through ammeter 51 and variable resistance 41 to electrode 31, the latter representing injection well 11. The other terminal of the E. M. F. source 57, e. g., the positive, is connected through ammeter 52 and variable resistance 42 to electrode 32, the latter representing production well 12; the latter terminal is also connected through ammeter 53 and variable resistance 43 to electrode 33 representing production well 13, through ammeter 54 and variable resistance 44 to electrode 35 representing production well 14, and through ammeter 55 and variable resistance 45 to electrode 34 representing production well 15. The latter terminal of E. M. F. source 57 is also connected through voltmeter 56 and variable resistance 46 to probe 58.

In the particular oil-bearing reservoir a water injection rate of $V_1$ barrels per day is being introduced into injection well 11, and output wells 12, 13, 14 and 15 are producing $V_2$, $V_3$, $V_4$ and $V_5$ barrels of liquids per day. To introduce these parameters into the electric model it is assumed that $$V_1 = V_2 + V_3 + V_4 + V_5$$

Then variable resistances 41, 42, 43, 44 and 45 are adjusted so ammeters 51, 52, 53, 54 and 55 give readings of $A_1$, $A_2$, $A_3$, $A_4$ and $A_5$ where C is an arbitrary constant and $$V_1 = CA_1$$
$$V_2 = CA_2$$
$$V_3 = CA_3$$
$$V_4 = CA_4$$
$$V_5 = CA_5$$

When the foregoing electrical current flows are obtained, a current flow into (or out of) injection well electrode 31 is proportional to the injection rate in well 11 while the current flow out of (or into) each of the electrodes 32, 33, 34 and 35 is proportional to the production rate of each of the production wells respectively.

Probe 58 is then placed at some point on one of the model layers, e. g. layer 29, and variable resistance 46 is then adjusted to bring voltmeter 56 within range. Probe 58 is then moved to various points on the layer and the various voltages are read from voltmeter 56 and recorded. Preferably probe 58 is moved to trace out equipotential contours on the layer by moving the probe so as to maintain a fixed reading on voltmeter 56. The determinatiton of the voltage pattern and preferably of the family of equipotential curves is completed for each of the model layers 22, 28 and 29 as desired. The equipotential curves for each of the three model layers are transferred to each of three separate maps of the reservoir respectively. The transfer to the maps may be effected mechanically, such as by a pantograph, according to the general method described by B. D. Lee in Potentiometric-Model Studies of Fluid Flow in Petroleum Reservoirs, Petroleum Technology, September 1947, or such transfer may be effected manually.

The equipotential contours when superimposed on a map of the field represent isobars of hydrodynamic pressure. In the aforecited article by B. D. Lee it was stated that $$\Delta t \sim \frac{\Delta X}{\Delta V/\Delta X} \sim \frac{(\Delta X)^2}{\Delta V}$$

where $\Delta t$ is the relative increment of transit time to move a particle of oil along the distance $\Delta X$ and $\Delta V$ is the relative voltage difference determined from the superimposed voltage pattern. Where $\Delta X$ is small and is always taken between equipotential curves differing by a fixed increment of voltage so that $\Delta V$ is therefore constant, then $$\Delta t \sim (\Delta X)^2$$

By this means the relative transit times among any series of points on the map are determined by measuring the distance increment $\Delta X$ along the normal between equipotential curves of constant voltage difference and squaring such distance increment $\Delta X$ to get relative transit times.

Although the foregoing method is the preferred method for determining relative transit times for oil movement, other methods may also be employed such as the method of Wm. Hurst and G. M. McCarty, Amer. Petr. Institute, Paper No. 901–17F. The latter method is considerably longer and is described in B. D. Lee's article cited hereinbefore.

From the transit time data determined for each permeability class the path of the advancing water front in any of the permeability classes of strata can be found. From such data it might be decided that certain highly permeable sections of the formation should be shut off by cementing in order to produce the field most advantageously. Such data might also indicate the desirability of shutting down wells producing the more highly permeable formations first, or of reassigning production rates among the producing wells to increase the ultimate production.

Although the foregoing illustration of my invention has been limited to a single electric model having three model layers it is apparent that models having 2, 3, 4, 5, 6, 7, 8 and even more model layers may be employed. It is usually preferable to employ about 3, 4 or 5 model layers, however, such preference is determined largely by the complexity of reservoir, the reliability and accuracy of the permeability data, and the amount of time to be devoted to the study.

In general for the construction of multi-layered models having N model layers, the electrical conductivity of the $n$th layer will be varied throughout its areal extent according to expression $X\overline{K}_n D_n$ where $X$ is a constant for the entire electric model, $\overline{K}_n$ is the average permeability of the strata of the $n$th permeability class, and $D_n$ is the function of the vertical extent of the strata of the $n$th permeability class throughout the areal extent of the oil-bearing reservoir.

A number of methods are useful for the actual fabrication of the model layers. In general the model layer comprises a relatively electrically conductive material joined to a relatitvely nonconductive material wherein the area of the model layer corresponds to the area of the segment of the oil-bearing formation being represented. Electrodes are attached to the electrically conductive material to represent each of the corresponding wells in the segment of the formation.

An electrically conductive material is generally one which has a medium or high specific electrical conductance, such as finely divided carbon, finely divided metallic powders, thin films of metals or carbon, weak ionic solutions and the like. Suitable electrically non-conductive materials include ceramics, plastics, asbestos, porous porcelain and the like.

The electrically conductive material can be joined to the electrically non-conductive material in a number of ways. In the preferred modification conducting material can be deposited on a non-conducting material by painting the latter with several layers of a dispersion of the former. Thus a model layer can be prepared by imprinting a porcelain surface with several layers of India ink. The variation of the number of layers of ink so applied varies the resistance of the finished surface to conform to the desired resistance pattern called for by the formation. In this case the conductivity of a given area is proportional to the thickness, i. e., number of layers, of the imprinted material.

Another type of model layer can be prepared by sculpturing a porous solid, such as porous porcelain into a sheet of varying thickness, wherein the thickness is proportional to the desired conductivity throughout its area. The porous sculptured solid sheets are then saturated with a weak ionic solution, such as 1% by weight of sodium chloride in water, whereby the sheets become electrical conductors having the desired resistance pattern.

In still another method the model layer is prepared by intimately mixing a melted or unset plastic, such as a melted methacrylate polymer, with a conducting agent such as finely divided carbon, powdered metals and the like whereby a uniform fluid or a moldable mass is obtained. The fluid or mass is then shaped or sculptured into a sheet of varying thickness and allowed to set or harden to a solid. The thickness of the sheet is proportional to the conductivity and is varied throughout to give the desired resistance pattern.

In any of the foregoing methods the electrodes are then attached to the solid model layer to represent the wells, input or output, of the oil-bearing formation and the oil flow distribution of formation is studied as has been described hereinbefore. It is apparent that such model layers may be studied separately or that several may be inter-connected and studied as a unit according to the methods described hereinbefore.

The term "segment" is used throughout the following claims to denote either a single horizontal section of an oil bearing formation or a number of such sections, which, although disconnected or partially disconnected, have been lumped together into a single group for the purpose of the model study, e. g. lumped into a single permeability class.

It is apparent that many modifications of the invention may be made by those skilled in the art without departing from the spirit and scope of the following claims.

I claim:

1. A method for electrically representing a segment of an oil-bearing formation which comprises joining an electrically conductive material with a relatively non-conductive material thereby forming a solid model layer, the area of said solid model layer corresponding to the area of said segment of said oil-bearing formation, controlling the quantity of said electrically conductive material per unit area of said solid model layer so as to be proportional to the product of the varying height of said segment of said oil-bearing formation by the average permeability per unit area of said segment of said oil-bearing formation, attaching input electrodes to said electrically conductive material of said solid model layer to correspond to input wells of said segment of said oil-bearing formation, attaching output electrodes to said electrically conductive material to correspond to output wells of said segment of said oil-bearing formation, causing an electrical current flow through each of said input electrodes which is proportional to the injection rate of each of the corresponding input wells of said segment of said oil-bearing formation respectively, causing an electrical current to flow through each of said output electrodes which is proportional to the output rate of each of the corresponding output wells of said segment of said oil-bearing formation, respectively, said electrical current flow through each of said input electrodes being opposite in sign to said electrical current flow through each of said output electrodes, and determining the relative voltage distribution throughout at least a part of said electrically conductive material.

2. A method according to claim 1 wherein said joining an electrically conductive material with a relaitvely non-conductive material comprises imprinting a coating of a dispersion of said electrically conductive material upon said relatively non-conductive material and wherein said controlling comprises varying the thickness of said coating.

3. A method according to claim 1 wherein said relatively non-conductive material is a sheet of porous solid having a varying thickness and said electrically conductive material is a weak ionic solution and wherein said joining an electrically conductive material with a relatively non-conductive material comprises saturating a sheet of said relatively non-conductive material with said electrically conductive material and wherein said controlling comprises varying the thickness of said electrically non-conductive material.

4. A method according to claim 1 wherein said electrically conductive material is a solid and said relatively non-conductive material is a liquid plastic and wherein said joining an electrically conductive material with a relatively non-conductive material comprises dispersing said electrically conductive material in said relatively non-conductive material to form a dispersion, solidifying said dispersion and forming into a sheet, wherein said controlling comprises varying the thickness of said sheet.

5. A method for constructing an electrical model to represent an oil-bearing formation comprising strata of N permeability classes wherein said N is an integer greater than 1 and less than 9, said model comprising a series of N model layers, wherein the $n$th model layer of said series of model layers corresponds to strata of the $n$th permeability class, which method comprises fabricating a first model layer so that the electrical conductivity of said first model layer varies throughout its areal extent according to $X\overline{K}_1 D_1$ where $X$ is a constant for the model, $\overline{K}_1$ is the average permeability of the strata of said first permeability class, and $D_1$ is the value of the varying vertical extent of the strata of said first permeability class throughout the areal extent of said oil-bearing reservoir, fabricating a second model layer so that the electrical conductivity of said second model layer varies throughout its areal extent according to $X\overline{K}_2 D_2$, where $\overline{K}_2$ is the average permeability of the strata of said second permeability class and $D_2$ is the value of the vertical extent of the strata of said second permeability class throughout the areal extent of said oil-bearing reservoir, and fabricating other model layers in like manner including the $N$th model layer wherein the electrical conductivity varies throughout the areal extent of said $N$th model layer according to $X\overline{K}_N D_N$, where $\overline{K}_N$ is the average permeability of the strata of said $N$th permeability class and $D_N$ is the value of the vertical extent of the strata of said $N$th permeability class throughout the areal extent of said oil-bearing reservoir, and attaching electrodes to each of said series of N model layers corresponding in location on each of the model layers to the location of corresponding wells in said oil bearing formation and electrically interconnecting all of such electrodes on each of said series of N model layers which correspond to a single well.

6. An apparatus for representing a segment of an oil-bearing formation and wells associated therewith which comprises an electrically conductive material joined to a relatively non-conductive material thereby forming a solid model layer, the area of said segment of said model layer corresponding to the area of said segment of said oil-bearing formation, the quantity of said electrically conductive material per unit area of said solid model layer being proportional to the product of the varying height of said segment of said oil-bearing formation by the average permeability per unit area of said segment of said oil-bearing formation, electrodes attached to said electrically conductive material corresponding to said wells, and an electric current supply for passing an electric current to each of said electrodes through an instrument for measuring current flow.

7. An apparatus for representing a segment of an oil-bearing formation which comprises an electrically conductive material joined to said relatively non-conductive material thereby forming a solid model layer, the area of said solid model layer corresponding to the area of said segment of said oil-bearing formation, the quantity of said electrically conductive material per unit area of said solid model layer being proportional to the product of the varying height of said segment of said oil-bearing formation by the average permeability per unit area of said segment of said oil-bearing formation, input electrodes attached to said electrically conductive material corresponding to input wells of said segment of said oil-bearing formation, output electrodes attached to said electrically conductive material corresponding to output wells of said segment of said oil-bearing formation, an electric current supply for passing an electrical current through each of said input electrodes at a rate which is proportional to the injection rate of each of the corresponding input wells, respectively, and for passing an electrical current through each of said output electrodes at a rate which is proportional to the output rate of each of the corresponding output wells, respectively, said electrical current flow through each of said input electrodes being opposite in sign to said electrical current flow through each of said output electrodes, and a probe for determining the relative voltage distribution throughout at least a part of said electrically conducting material.

8. An apparatus according to claim 7 wherein said electrically conductive material joined to said relatively non-conductive material comprises varying thicknesses of said electrically conductive material imprinted upon said relatively non-conductive material.

9. An apparatus according to claim 7 wherein said relatively non-conductive material is a porous solid and said electrically conductive material is a weak ionic solution and wherein said electrically conductive material joined to said relatively non-conductive material comprises a sheet of said relatively non-conductive material saturated with said electrically conductive material.

10. An apparatus according to claim 7 wherein said electrically conductive material joined to said relatively non-conductive material comprises a solid intimate dispersion of said electrically conductive material in said relatively non-conductive material.

11. An electric model for representing an oil-bearing formation comprising strata of a series of N permeability classes wherein said N is an integer greater than 1 and less than 9, said model comprising a series of N model layers wherein the $n$th model layer of said series of model layers corresponds to strata of the $n$th permeability class, each of said series model layers varying in electrical conductivity throughout its areal extent according to the generalized expression $X\overline{K}_nD_n$ for said $n$th layer, where X is a constant for said model, $\overline{K}_n$ is the average permeability of said strata of said $n$th permeability class and $D_n$ is the function of the varying vertical extent of said strata of said $n$th layer throughout the areal extent of said oil-bearing reservoir, and electrodes attached to each of said N model layers at points corresponding to wells in said oil bearing formation, electrodes of each of said N model layers corresponding to a particular well being electrically interconnected.

12. In a method for electrically representing an oil bearing formation wherein a series of model layers are employed, each of said model layers corresponding to a section of said oil bearing formation and wherein the electrical conductivity of each of said model layers varies in proportion to the product of the average permeability and the varying vertical extent of said section of said oil bearing formation, the improvement which comprises dividing said formation into a number of segments, grouping segments of substantially the same permeability into a series of classes, corresponding to said series of model layers, varying the electrical conductivity of each of said model layers in proportion to the product of the average permeability of a corresponding class of segments by the sum of the vertical extents of said segments constituting the corresponding class.

13. A method for preparing an apparatus for electrically representing a segment of an oil bearing formation and wells associated therewith which method comprises joining an electrically conductive material with a relatively non-conductive material thereby forming a solid model layer, controlling each incremental area of said solid model layer so as to correspond to a corresponding incremental area of said segment of said oil bearing formation, controlling the quantity of said electrically conductive material per unit area of said solid model area at each point of said solid model layer so that the quantity of electrically conductive material varies in proportion to the product of the varying height of said segment of said oil bearing formation by the average permeability per unit area of said segment of said oil bearing formation, and attaching electrodes to said electrically conductive material of said solid model layer at each of the several points of said model layer corresponding to each of said wells.

14. An apparatus for representing a segment of an oil bearing formation and wells associated therewith which apparatus comprises an electrically conductive material joined to a relatively non-conducting material thereby forming a solid model layer, the incremental areas of said segment of said model layer corresponding to the incremental areas of said segment of said oil bearing formation, the quantity of electrically conductive material per unit area of said solid model layer at each point of said solid model layer varying in proportion to the product of the varying height of said segment of said oil bearing formation by the average permeability per unit area of said segment of said oil bearing formation at the point corresponding in said segment, electrodes attached to said electrically conductive material corresponding to each of said wells of said oil bearing formation, electrical means for creating a potential difference between two or more of said electrodes and electrical means for measuring potential differences on said model layer.

15. In a method for electrically representing an oil bearing formation wherein a series of model layers are employed, each of said model layers corresponding to a section of said oil bearing formation and wherein the electrical conductivity of each of said model layers varies throughout the respective areas of each of said model layers in proportion to the product of the average permeability and the varying vertical extent of said section of said oil bearing formation corresponding to said model layer, the improvement which comprises dividing said formation into a number of segments, grouping segments of substantially the same permeability into a series of classes, corresponding to said series of model layers, varying the electrical conductivity of each of said model layers in proportion to the product of the average permeability of a corresponding class of segments by the sum of the vertical extents of said segments constituting the corresponding class.

JOHN E. SHERBORNE.

References Cited in the file of this patent

UNITED STATES PATENTS

| Number | Name | Date |
|---|---|---|
| 1,683,952 | Cadman | Sept. 11, 1928 |
| 2,423,754 | Bruce | July 8, 1947 |
| 2,472,464 | Bruce | June 7, 1949 |
| 2,569,510 | Wolf | Oct. 2, 1951 |
| 2,569,817 | Wolf et al. | Oct. 2, 1951 |

OTHER REFERENCES

"Printed Circuit Techniques," Brunnetti, U. S. Dept. of Commerce; National Bureau of Standards Circular 468.